12) United States Patent
Patton et al.

(10) Patent No.: US 8,230,351 B2
(45) Date of Patent: Jul. 24, 2012

(54) METHOD AND APPARATUS FOR COLLABORATIVE WORK

(75) Inventors: Charles M. Patton, Eugene, OR (US); Christopher DiGiano, Boulder, CO (US); Krista Davis, San Diego, CA (US); John Brecht, San Francisco, CA (US); Alexandra Harris, Palo Alto, CA (US); Patricia Schank, Menlo Park, CA (US); Jeremy Roschelle, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 474 days.

(21) Appl. No.: 11/734,158

(22) Filed: Apr. 11, 2007

(65) Prior Publication Data

US 2007/0239828 A1 Oct. 11, 2007

Related U.S. Application Data

(60) Provisional application No. 60/744,662, filed on Apr. 11, 2006, provisional application No. 60/805,854, filed on Jun. 26, 2006.

(51) Int. Cl.
*G06F 3/048* (2006.01)
*G06F 17/50* (2006.01)

(52) U.S. Cl. .......... 715/753; 715/229; 715/971
(58) Field of Classification Search .......... 715/759, 715/229, 753, 971
See application file for complete search history.

(56) References Cited

U.S. PATENT DOCUMENTS

| | | | | |
|---|---|---|---|---|
| 5,107,443 A * | 4/1992 | Smith et al. | .......... | 715/751 |
| 5,581,702 A * | 12/1996 | McArdle et al. | .......... | 709/204 |
| 7,266,777 B2 * | 9/2007 | Scott et al. | .......... | 715/762 |
| 8,019,817 B2 * | 9/2011 | Yoshida et al. | .......... | 709/205 |

* cited by examiner

*Primary Examiner* — Namitha Pillai

(57) ABSTRACT

A method and apparatus for collaborative work is provided. One embodiment of a method for facilitating a collaborative task undertaken by a plurality of users, where each of the users uses a networked computing device that displays a user interface including a public panel representing a shared workspace and a private panel representing a personal workspace, includes receiving, by a server, a first request from a user to move a component from the shared workspace to the user's personal workspace The component represents an individual contribution to the collaborative task. The method then renders the component unavailable for use (e.g., moving or editing) by the other users.

22 Claims, 11 Drawing Sheets

METHOD AND APPARATUS FOR COLLABORATIVE WORK

CROSS REFERENCE TO RELATED APPLICATIONS

This application claims the benefit of U.S. Provisional Patent Application Ser. Nos. 60/744,662, filed Apr. 11, 2006; and Ser. No. 60/805,854, filed Jun. 26, 2006. Both of these applications are herein incorporated by reference in their entireties.

REFERENCE TO GOVERNMENT FUNDING

This invention was made with Government support under grant number REC-0427783 awarded by the National Science Foundation. The Government has certain rights in this invention.

FIELD OF THE INVENTION

The present invention relates generally to the field of computer-supported collaborative work environments.

BACKGROUND OF THE DISCLOSURE

In the workplace and in the classroom, there is an ever-increasing appreciation of—and demand for—harnessing the collective intelligence of groups to learn faster, envision new possibilities, and reveal latent knowledge. Even so, technological support for these real-time, face-to-face processes has fallen far behind the expanding need.

Outside of the classroom, the most successful such supportive technology is paper-based. This technology includes, for example, "Idea-Catchers®," "Post-It® notes," and other "stickies" of various sizes and shapes. Inside classrooms, where budgets for supplies are typically very tight, these paper-based approaches are infrequently used. In the realm of computer-supported collaboration, student response systems (SRS, sometimes called "clickers") are growing in popularity. Clicker systems, however, support only the most rudimentary of whole-group processes (e.g., the classroom analog of voting). Employed appropriately, however, these "clickers" can be a powerful tool for stimulating important conversations, encouraging active conceptualization, and providing graphic illustration of what the class does—and doesn't—know and believe. But, obviously, a lot of important conceptual work cannot be represented as voting. And while Post-It® notes can form the medium for a much broader range of conceptual work, their physicality necessitates a lot of manual busy work (e.g., distributing, collecting, copying and duplicating, moving from place to place, etc.), as well as ongoing supply, archiving, and publication issues.

Thus, there is a need in the art for a method and apparatus for providing light-weight, flexible support for brainstorming, deep dives, and collaborative decision making with automated distribution, collection, and aggregation support.

SUMMARY OF THE INVENTION

A method and apparatus for collaborative work is provided. One embodiment of a method for facilitating a collaborative task undertaken by a plurality of users, where each of the users uses a networked computing device that displays a user interface including a public panel representing a shared workspace and a private panel representing a personal workspace, includes receiving, by a server, a request from a user to move a component from the shared workspace to the user's personal workspace The component represents an individual contribution to the collaborative task. The method then renders the component unavailable for use (e.g., moving or editing) by the other users.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for collaborative work. Embodiments of the present invention use a graphical user interface that enables collaborative work environments when implemented on each of a plurality of networked computing devices. Further embodiments of the present invention facilitate organized collaboration by automatically resolving situations in which two or more collaborators simultaneously contend for the same shared resource. Although certain aspects of the present invention are described herein within the exemplary context of a classroom environment, it is to be appreciated that the invention is not so limited, and that aspects of the present invention are applicable in any type of collaborative work environment.

Figure 1:
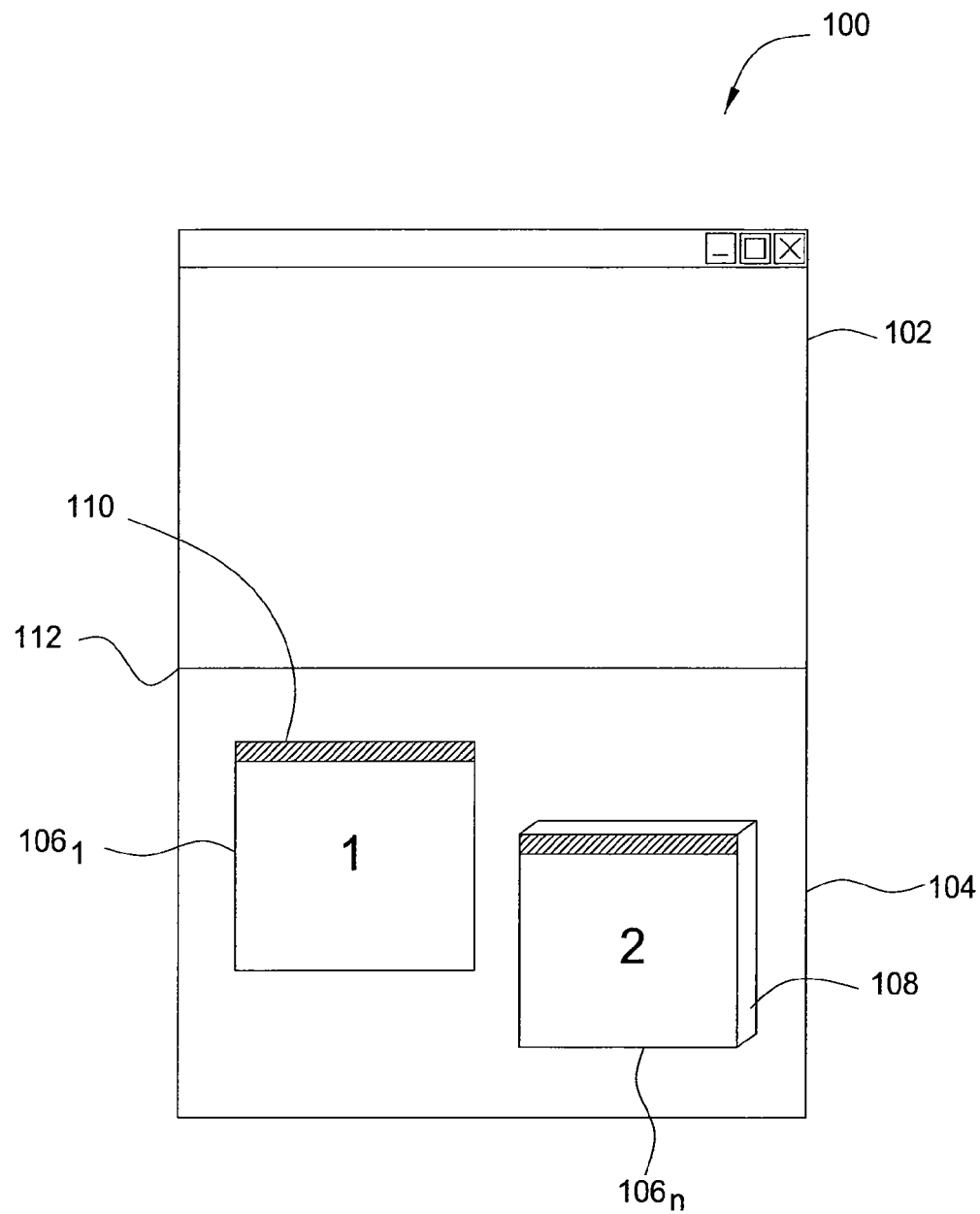
FIG. 1 depicts one embodiment of a user interface 100, according to the present invention.
Figure 2:
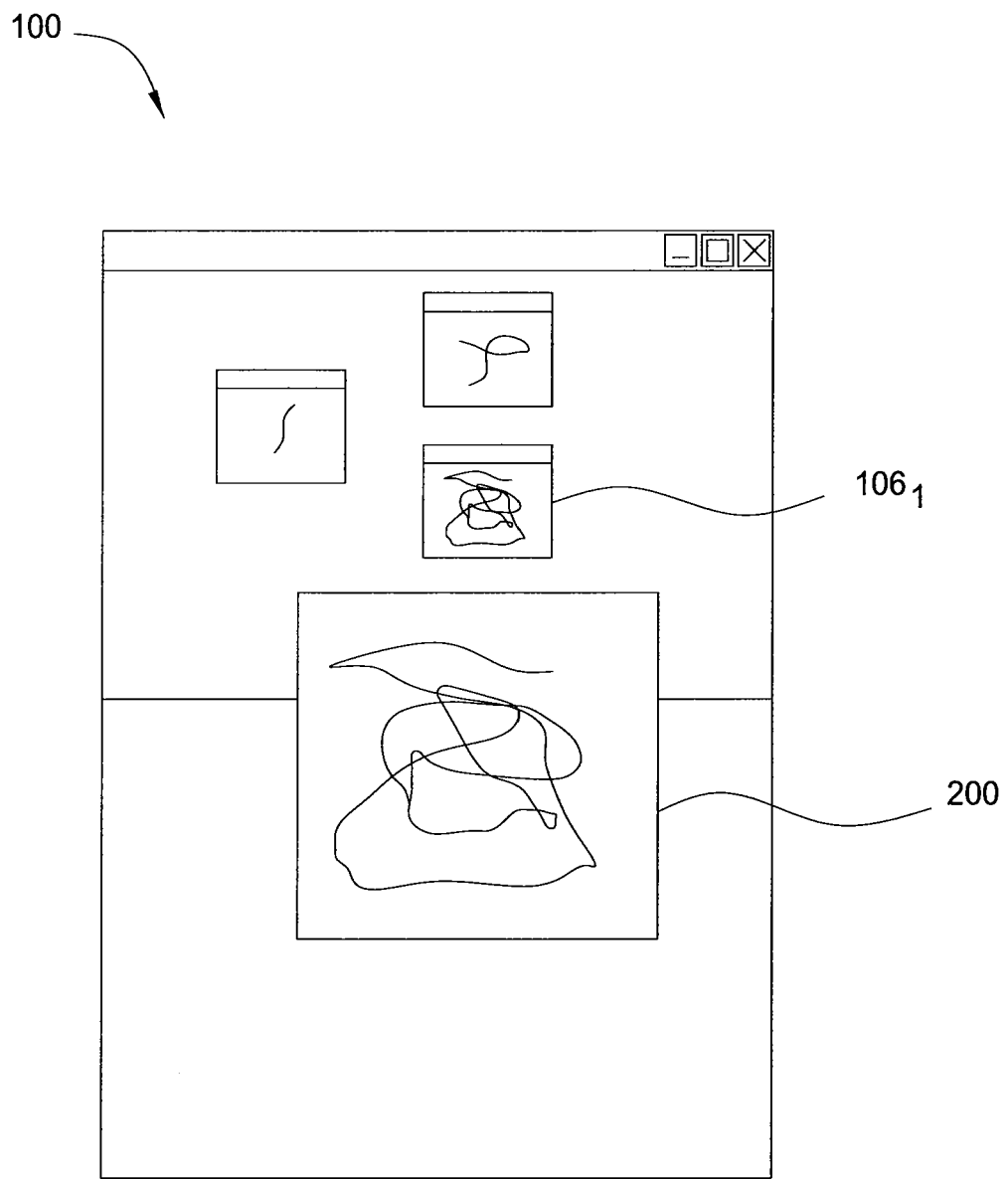
FIG. 2 depicts an alternate view of the user interface illustrated in FIG. 1.

FIG. 1 depicts one embodiment of a user interface 100, according to the present invention. FIG. 2 depicts an alternate view of the user interface 100 illustrated in FIG. 1. The user interface 100 may be implemented, for example, on each of a plurality of networked computing devices that are communicatively coupled to a server that mediates interactions with a workspace shared by the networked computing devices. In one embodiment, the networked computing devices are any combination of desktop computers, laptop computers, tablet computers, personal digital assistants (PDAs), mobile telephones, and the like. In one embodiment, the server mediating interactions with the shared workspace is a generic tuple space server (e.g., an IBM T-spaces server, commercially available from IBM Corporation of Armonk, N.Y.). In one embodiment, the user interface 100 includes a means of selecting the server, and selecting or creating a named activity space within the server.

The user interface 100 illustrated in FIG. 1 depicts the user interface displayed on any given one of a plurality of networked computing devices in use by a user who is participating in a given activity with other users. To this end, the user interface 100 comprises two contiguous panels (i.e., display regions) representing, respectively, a public panel 102 and a private panel 104. The public panel 102 represents a shared workspace, while the private panel 104 represents a personal workspace. In addition, the user interface 100 comprises a plurality of individually selectable graphical elements ("annotations") $106_1$-$106_n$ (hereinafter collectively referred to as "annotations 106"), each of which may be further configured as an annotation pad 108. Each annotation 106 comprises an individual contribution (e.g., an idea, a question, etc.) to the collaborative process. Although they are described as "graphical" elements, annotations may comprise graphics, text or a combination thereof. In one embodiment, at least some of the annotations 106 are user-created. In one embodiment, an annotation pad 108 comprises a finite number of blank annotations 106 that may be selected by a user for the purposes of creating a new annotation 106. Whenever the "top" or visible annotation 106 of the annotation pad 108 is moved to a new location (e.g., using the drag bar 110), a new, blank annotation 106 is displayed as the "top" or visible annotation on the annotation pad 108. Thus, the annotation pad 108 may be thought of as the computer-supported equivalent of a note pad.

The user interface 100 can be further configured to provide an infinite number of blank annotations 106 in the private panel 104. An annotation pad that can provide an infinite (bounded by the capacity of the computational device) number of annotations is hereinafter referred to as a "self-refreshing annotation pad".

The user interface 100 is configured to allow modification to the graphical content of any selected annotation 106 or annotation pad 108. In one embodiment, individual annotations 106 are created and/or modified in the private panel 104 of a given user. For example, the user interface 100 may be implemented on a computing device comprising a stylus and a touch sensitive display, with appropriate software to enable their operation, as known in the art. Alternative system embodiments that allow modification of content displayed in the user interface may also be implemented.

The user interface 100 is further configured to allow movement of a selected annotation 106. For example, an upper region or drag bar 110 on an individual annotation 106 may be selected with a mouse or stylus and dragged to a new position on a display of a computing device.

The user interface 100 is further configured to allow each user to transfer a selected annotation 106 from his/her private panel 104 to the public panel 102 (or vice-versa), for example by dragging the annotation 106 across a dividing line 112 between the private panel 104 and the public panel 102. As described above, individual annotations 106 may be created in the private panel 104 of a given user, and may be moved by the user to the public panel 102 for viewing by all or by a sub-group of the users (as discussed in greater detail below). In addition, individual annotations may be removed from the public panel 102 to the private panel 104 of a given user, for further review and/or modification. In one embodiment, movement of an annotation 106 from the public panel 102 to a user's private panel 104 renders the annotation 106 invisible and/or inaccessible to other users until the user who moved the annotation 106 places the annotation back in the public panel 102.

The user interface 100 is further configured to update the contents of the public panel 102 to reflect actions taken by other users connected to the same activity. That is, the public panel 102 displayed to any given user will reflect the actions taken by other users working in the same shared space. In one embodiment, updating of the public panel occurs in accordance with at least one of: manual update, periodic update, and action-based update. In manual update, the user chooses when to initiate an update from the server. In periodic update, the user chooses to have the update occur on a pre-scheduled basis. In action-based update, the user can choose to have the user interface 100 register for notification from the server when one of a class of predefined actions takes place on the server. The receipt of such notifications then trigger the updates.

In one embodiment, the user interface 100 is further configured to display, at the user's request, the contents of each and every annotation 106 in the public panel 102 and private panel 104 without moving, selecting, or otherwise disturbing the arrangement of the annotations 106. In one embodiment, methods for displaying the annotations 106 include at least one of: panning, zooming and sequential annotation viewing. In panning, the user moves the viewing position relative to the content of a panel, for example by dragging with a stylus on the background of the panel. In zooming, the content of the panel is shown at smaller scale, or less of the content of the panel is shown at larger scale. In sequential annotation viewing, each annotation 106 in a panel can be brought into view sequentially in a single annotation view overlay 200, as depicted in FIG. 2. In some embodiments, the user may change the view of the next or previous annotation 106 in the (implicit) sequence by signaling with a non-graphical input (e.g., by using a designated key on a keyboard). The sequence in which the annotations 106 are displayed may be determined in accordance with any one or more of a number of criteria. For example, in one embodiment, the sequence is ordered by time-stamp of annotation creation, which has the advantage of being independent of graphical position.

In one embodiment, the user interface 100 implements methods for resolving contention for selection (i.e., movement from the shared workspace represented by the public panel 102 to the personal workspace represented by the private panel 104) of an annotation 106 in the public panel 102. As discussed above, in some embodiments, movement of an annotation 106 from the public panel 102 to a given user's private panel 102 will render the annotation 106 invisible and/or inaccessible to other users, as long as the annotation 106 remains within the given user's private panel 104. Since there is no possibility of contention for annotations 106 in the private panel 104, a user need only, for example, tap an annotation 106 in the private panel 104 (e.g., using a stylus or other implement on the drag bar 110) to select the annotation 106. However, if the annotation 106 is in the public panel 102, there are several potential complications. First, the annotation 106 that the user has chosen may not be accurately represented in his/her local view of the public space. For example, if the user's public panel 102 has not been updated for some time, the user's public panel 102 may not represent the most up to date information (e.g., the chosen annotation 106 may have since been moved within the shared workspace represented by the public panel 102, or the chosen annotation 106 may have been removed altogether). Second, one or more other users may have, or may be attempting to, select the same annotation 106.

Figure 3:
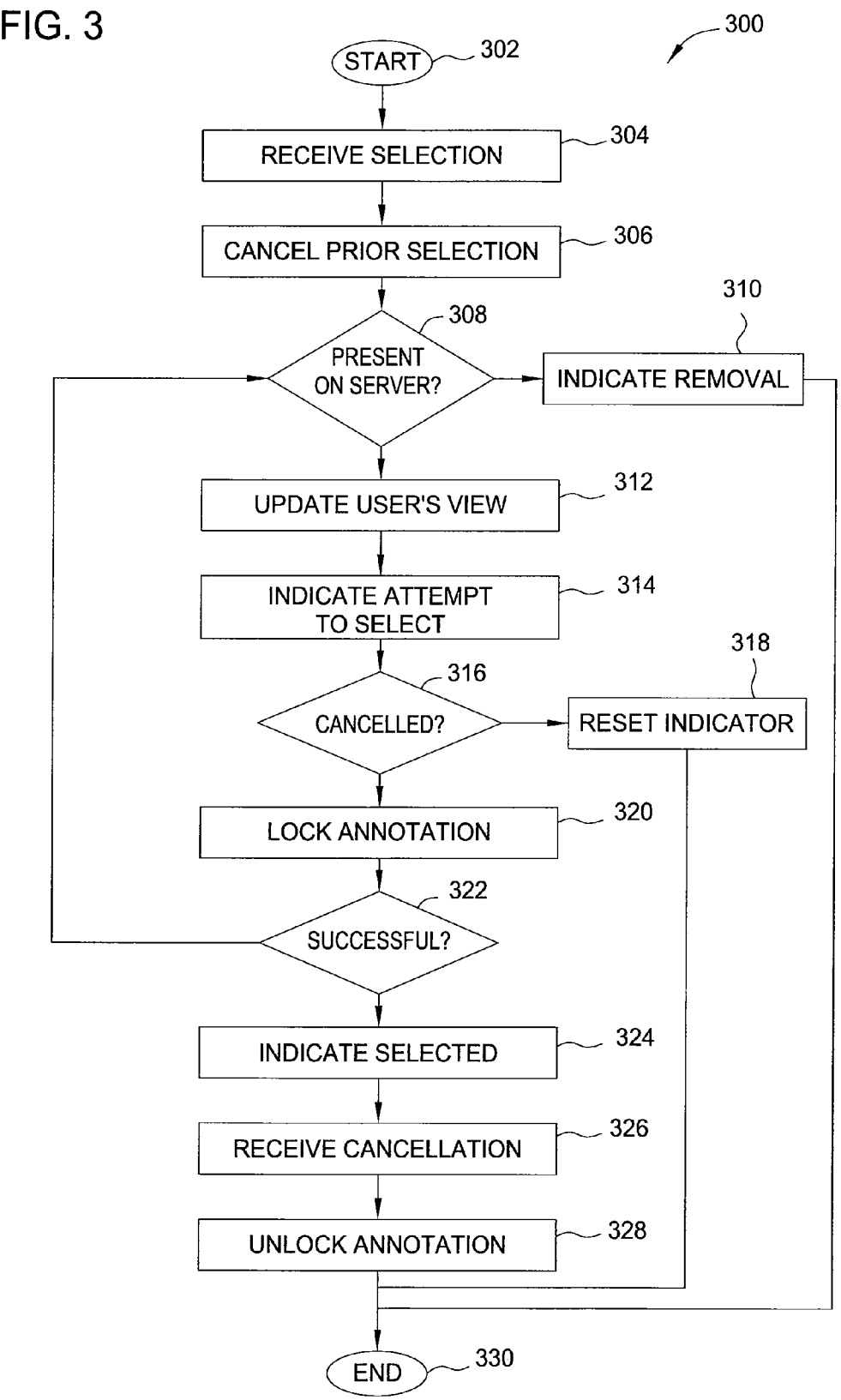
FIG. 3 is a flow diagram illustrating one embodiment of a method for resolving contention for common resources in a collaborative environment, according to the present invention.

FIG. 3 is a flow diagram illustrating one embodiment of a method 300 for resolving contention for common resources (e.g., annotations) in a collaborative environment, according to the present invention. The method 300 may be implemented, for example, at a server that interacts with a plurality of networked computing devices using the user interface described with reference to FIGS. 1 and 2.

The method 300 is initialized at step 302 and proceeds to step 304, where the method 300 receives a user signal indicating the user's intention to select a single annotation in the shared workspace. In one embodiment, the user signal is received via the pressing of a stylus or other implement on a drag bar of the selected annotation in a user interface display. At step 306, the method 300 cancels any other selections previously made by the user.

At step 308, the method 300 determines whether the selected annotation is present on the server. In one embodiment, the method 300 determines whether the selected annotation is present on the server by querying the server (e.g., by issuing a READ command for the selected annotation).

If the method 300 concludes in step 308 that the selected annotation is not present on the server, the method 300 proceeds to step 310 and indicates to the user that the selected annotation is no longer present on the server. In one embodiment, the indication to the user is a visual indication. The method 300 then terminates in step 330.

Alternatively, if the method 300 concludes in step 308 that the selected annotation is still present on the server, the method 300 proceeds to step 312 and updates the positions of all annotations in the public panel of the user's user interface to reflect the (possibly new) position of the selected annotation relative to other annotations. At step 314, the method 300 updates the appearance of the selected annotation to indicate the novel state: attempting to secure control of the selected annotation. In one embodiment, the selected annotation is rendered with a unique border style to indicate control. In another embodiment, non-controlling users see the selected annotation rendered with a special "inactive" border style. For example, the drag bar of the selected annotation may be modified (e.g., grayed out). In further embodiments, other sorts of detectable modifications are made to the selected annotation to indicate the selection. In further embodiments still, where the normal elapsed time in the selected state is relatively small, step 314 is omitted.

At step 316, the method 300 determines whether the user has cancelled the attempted selection (e.g., by attempting to select a different annotation). If the method 300 concludes in step 316 that the user has cancelled the attempted selection, the method 300 proceeds to step 318 and restores the visual appearance of the (now unselected) annotation in the public panel of the user's user interface display before terminating in step 330. That is, the method 300 restores the public panel to its original (i.e., pre-step 314) appearance.

Alternatively, if the method 300 concludes in step 316 that the user has not cancelled the selection attempt, the method 300 proceeds to step 320 and obtains a mutual exclusion lock for updating the selected annotation. In one embodiment (e.g., where the server is a tuple server), this is accomplished by issuing a TAKE command to the server. In the tuple space architecture, a TAKE command embodies a mutual exclusion mechanism (i.e., only one request for a TAKE of a given tuple will be successful). Moreover, the TAKE command executes as a transaction, such that both removal of the selected annotation from the public panel and placement of the selected annotation in the private panel succeed or fail together (i.e., either both actions succeed or both actions fail). In such embodiments, the TAKE command is issued not for the selected annotation itself (since, if the annotation is successfully selected, no other users would be able to view the selected annotation), but for a selection token associated with the selected annotation. In one embodiment, the selection token is instantiated when the selected annotation is transferred from a private panel to the public panel.

At step 322, the method 300 determines whether the mutual exclusion lock attempted in step 320 was successful. If the method 300 concludes in step 322 that the mutual exclusion lock was not successful, the method 300 returns to step 308 and proceeds as described above.

Alternatively, if the method 300 concludes in step 322 that the mutual exclusion lock was successful, the method 300 proceeds to step 324 and indicates that the selected annotation is selected and available for user interaction until the user cancels the selection. In one embodiment, the method 300 indicates the successful selection visually.

In step 326, the method 300 receives a signal from the user indicating that the user wishes to cancel selection of the selected annotation. In one embodiment, the user signal is received via the releasing of a stylus or other implement from a drag bar of the selected annotation in a user interface display.

In step 328, if the (now unselected) annotation is still in the public panel of the user interface, the method 300 releases the mutual exclusion lock. In one embodiment (e.g., where the server is a tuple server), the selection token associated with the unselected annotation is written back to the server, making the annotation available for another TAKE operation. In addition, the visual appearance of the unselected annotation is restored to its pre-selection state before the method 300 terminates in step 330.

The method 300 substantially ensures that only one participant in a computer-supported collaborative work environment is able to select and/or modify (e.g., read, move, annotate and/or indicate a relationship including) an annotation at any given time. This simplifies the task of ensuring that a consistent view of the shared workspace is presented to each participant as participants continue to work on individual tasks related to the collaborative task.

An example use of the invention is now discussed with reference to FIGS. 4A through 9B, in which the present invention's utility for supporting collaborative and individual capture, collection, arrangement, selection, and the like is demonstrated. The exemplary context is a middle school math classroom, in which each student uses a computing device implementing the user interface of the present invention. A teacher wants to help her students strengthen their understanding of relationships among various representations of rational numbers (e.g., fractional form, decimal form, pie charts, etc). To do this, the teacher needs each student to have a diversity of numbers to consider. So the teacher asks the students to count off and, when finished, to write down the fraction that has their count off number in the numerator and the number four in the denominator.

Figure 4A:
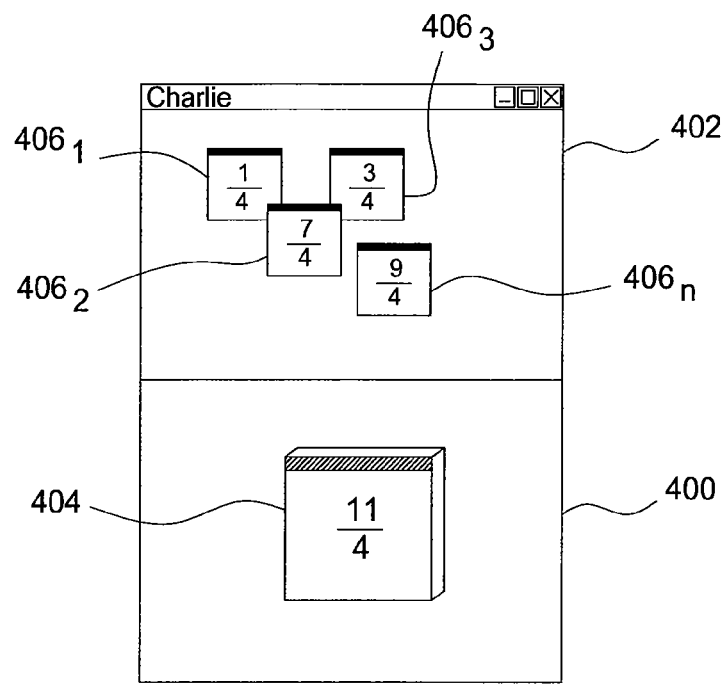
FIG. 4A depicts one embodiment of a first step in an exemplary use of the present invention.
Figure 4B:
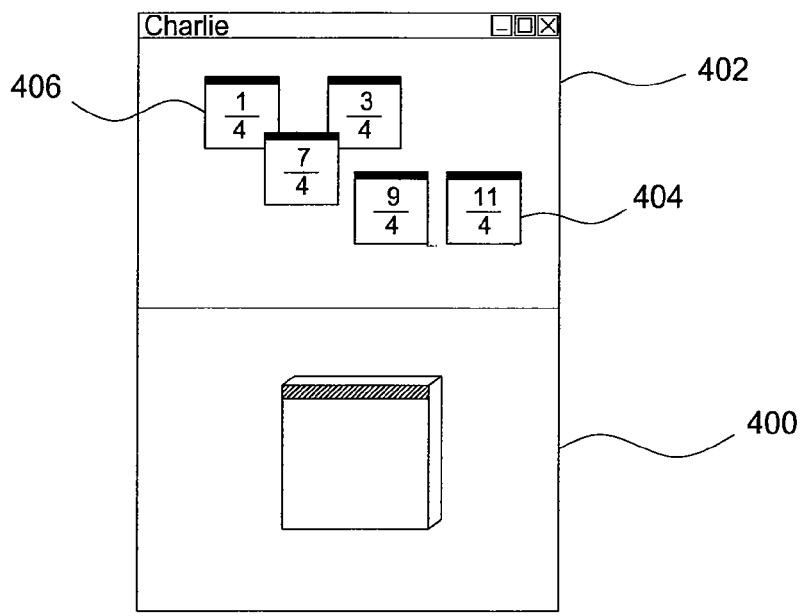
FIG. 4B depicts one embodiment of a second step in the exemplary use of the present invention.

FIG. 4A depicts one embodiment of a first step in the exemplary use of the present invention. As shown in FIG. 4A, a student logged in as "Charlie" has a count off number of eleven. While he was capturing his understanding of numerators and denominators on an annotation 404 (on top of an annotation pad) in his private panel 400, other students' efforts have been collecting on the public panel 402, as represented by a plurality of annotations $406_1$-$406_n$ (hereinafter referred to as "student annotations 406"). When finished, Charlie drags the annotation 404 representing his contribution to the public panel 402, as shown in FIG. 4B, which depicts one embodiment of a second step in the exemplary use of the present invention.

The teacher then asks each student to select another student's contribution from among of the plurality of student annotations 406 in the public panel 402, to take the selected annotation from the public panel 402, to make an alternate (graphical) representation of the rational number, and to place an annotation pair comprising the selected annotation and the alternate representation back on the public panel 402.

Figure 5A:
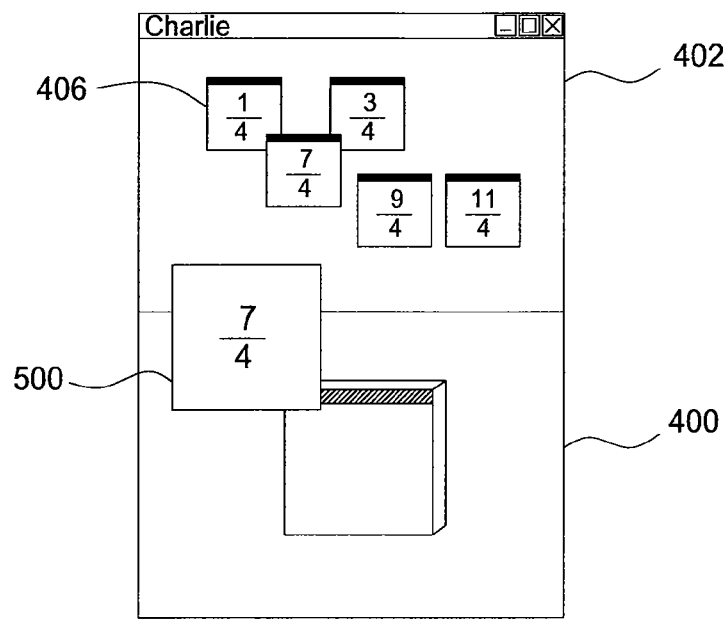
FIG. 5A depicts one embodiment of a third step in the exemplary use of the present invention.
Figure 5B:
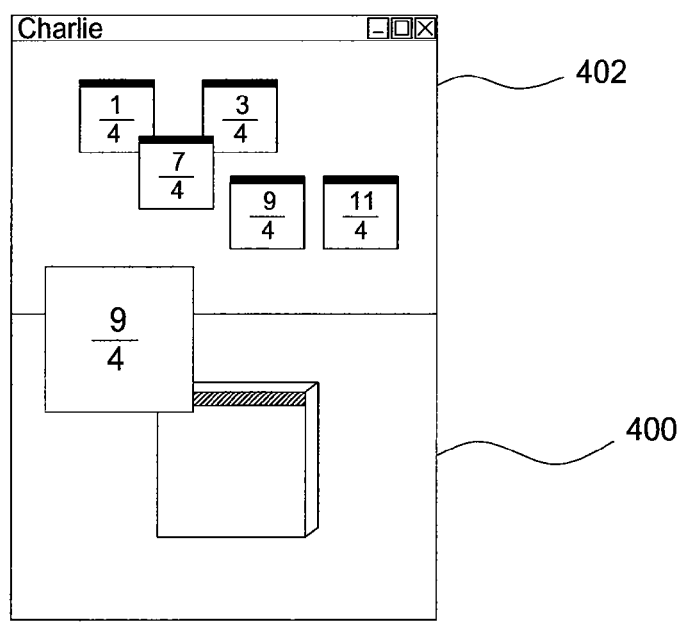
FIG. 5B depicts one embodiment of a fourth step in the exemplary use of the present invention.

Charlie browses through the fractions on the public panel 402 represented by the plurality of student annotations 406, as depicted in FIG. 5A, which depicts one embodiment of a third step in the exemplary use of the present invention. The currently browsed annotation 500 is viewed using a single annotation view overlay (e.g., as described earlier herein with reference to FIG. 2). Charlie eventually decides on the fraction 9/4, depicted in FIG. 5B, which depicts one embodiment of a fourth step in the exemplary use of the present invention.

Figure 6A:
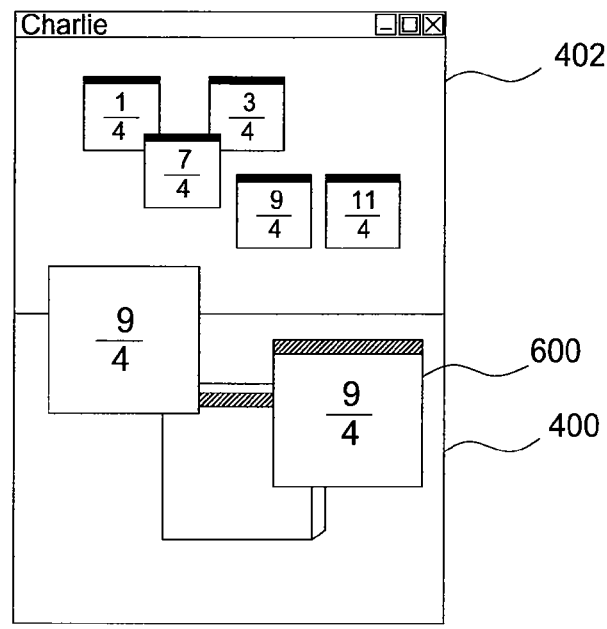
FIG. 6A depicts one embodiment of a fifth step in the exemplary use of the present invention.
Figure 6B:
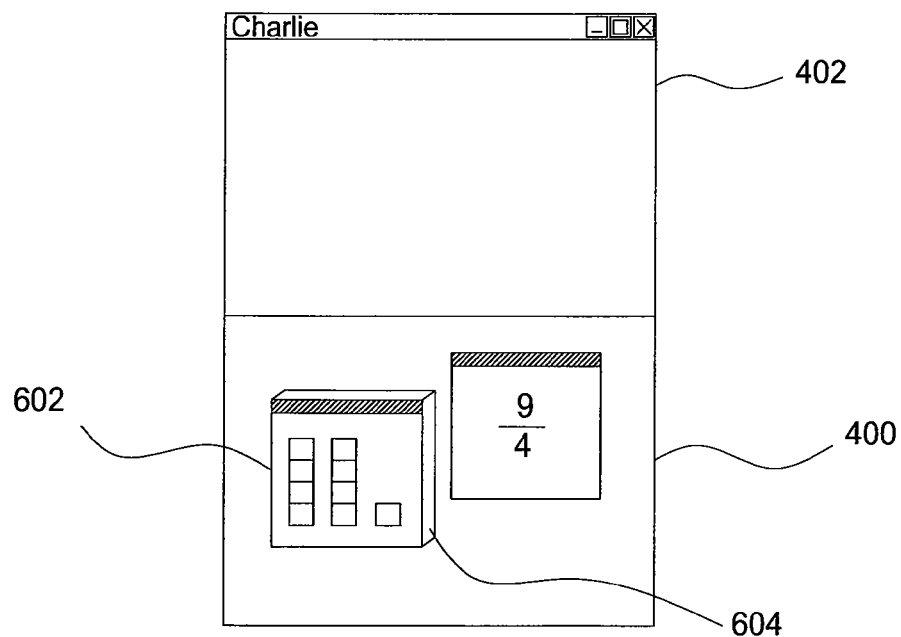
FIG. 6B depicts one embodiment of a sixth step in the exemplary use of the present invention.

As shown in FIG. 6A, which depicts one embodiment of a fifth step in the exemplary use of the present invention, Charlie locates the annotation 600 depicting the fraction 9/4 and drags the selected annotation 600 to his private panel 400. Charlie creates a bar representation of the fraction 9/4 as an alternate representation annotation 602 on the annotation on top of annotation pad 604, as shown in FIG. 6B, which depicts one embodiment of a sixth step in the exemplary use of the present invention. Meanwhile, other students have taken the other student annotations 406 from the public panel 402 and are working on the alternate representations in their respective private panels, leaving the public panel 402 temporarily empty.

Figure 7A:
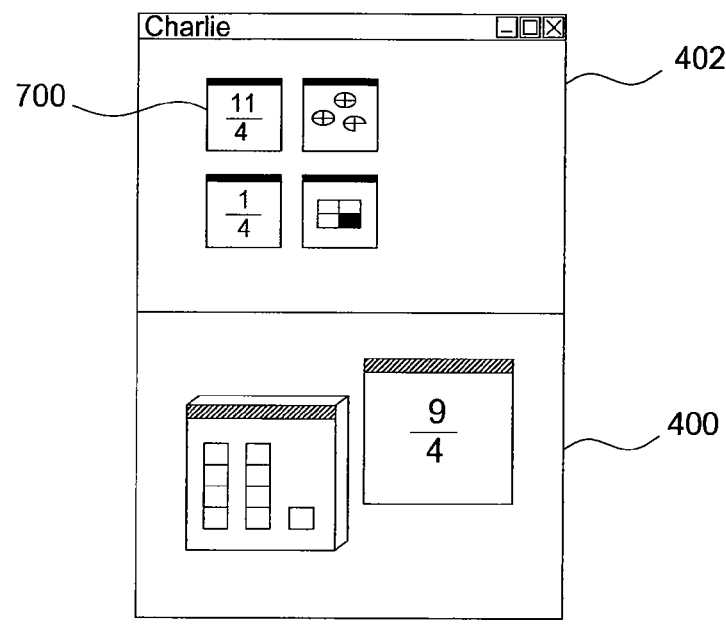
FIG. 7A depicts one embodiment of a seventh step in the exemplary use of the present invention.
Figure 7B:
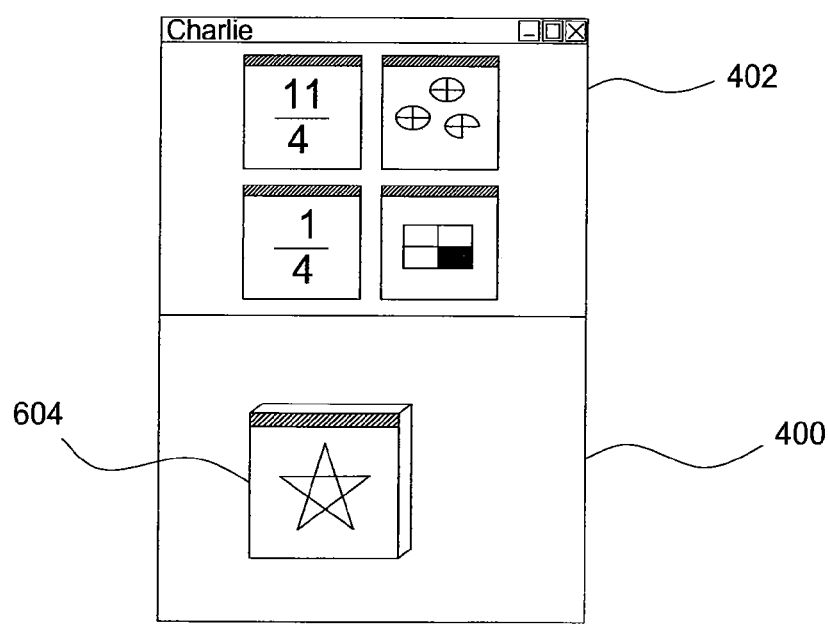
FIG. 7B depicts one embodiment of an eighth step in the exemplary use of the present invention.

The students are then asked to move their annotation pairs (comprising the selected student annotations 406 (fractions) and alternate representation annotations, e.g., alternate representation annotation 602) to the public panel 402. As shown in FIG. 7A, which depicts one embodiment of a seventh step in the exemplary use of the present invention, the teacher arranges the first incoming annotation pair 700 so that the selected student annotation (fraction) is on the left and the alternate representation annotation on the right. Subsequent students arrange their annotation pairs in the same pattern. The teacher tells the students that when they are done arranging their annotation pairs, they should look over all of the annotation pairs and mark (e.g., by placing a star by) the annotation pair for which they think that the alternate representation best expresses the fraction. Charlie prepares by drawing a star on the new annotation on top of annotation pad 604 as depicted in FIG. 7B, which depicts one embodiment of an eighth step in the exemplary use of the present invention.

Figure 8A:
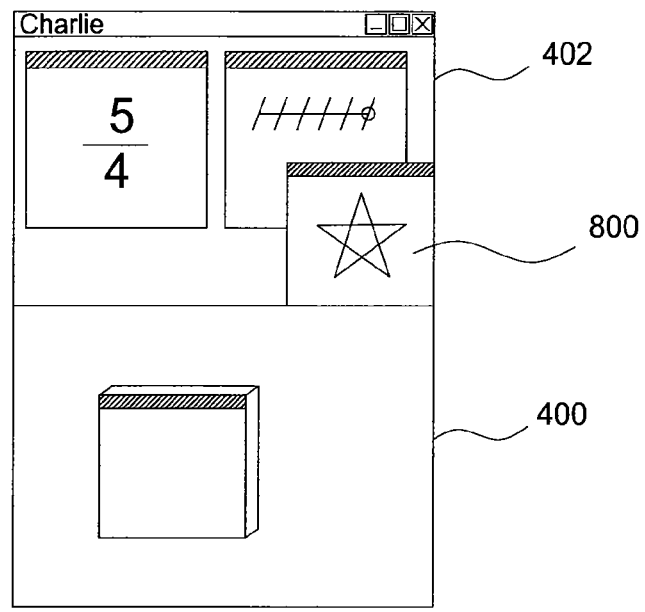
FIG. 8A depicts one embodiment of a ninth step in the exemplary use of the present invention.
Figure 8B:
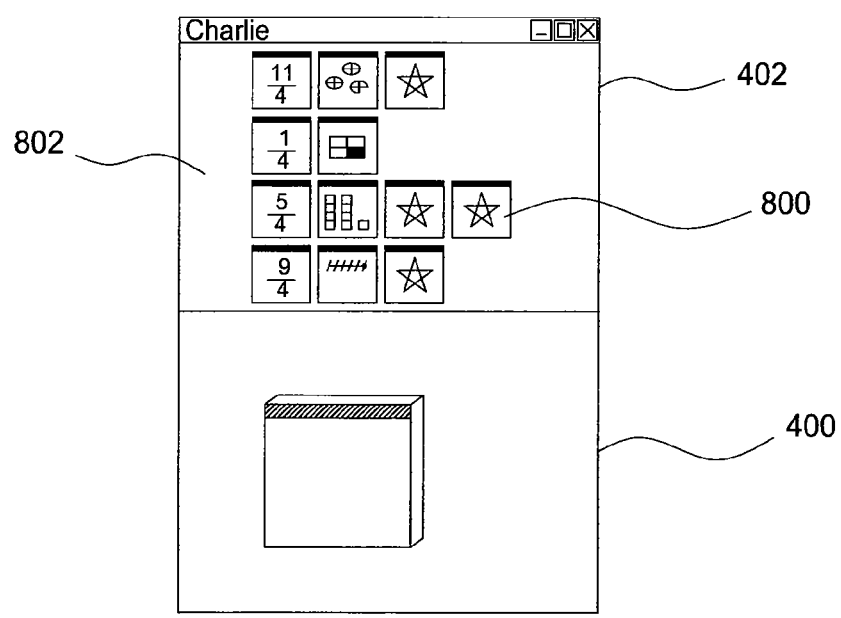
FIG. 8B depicts one embodiment of a tenth step in the exemplary use of the present invention.

Charlie then zooms in his view of the public panel 402 and moves the annotation 800 with his star to the public panel 402 next to the number line presentation 802 as depicted in FIG. 8A, which depicts one embodiment of a ninth step in the exemplary use of the present invention. He then zooms out his view of public panel 402, so that all of the plurality of annotations pairs 700 is visible and he can see the collaboratively expressed relationships, as depicted in FIG. 8B, which depicts one embodiment of a tenth step in the exemplary use of the present invention.

After discussing the relative merits of the choices the students have made, the teacher decides that it is time to assess the learning of the group. She drags all of the annotation pairs 700 to her private panel 400 and selects four alternate representation annotations and one of the corresponding fraction annotations from among the annotation pairs 700. She creates a new annotation using a combination of typed text and handwritten mathematical notation that poses the question of which alternate representation corresponds best with a particular fraction. She then drags the question-posing annotation and the four alternate representation annotations to the public panel 402, arranging them in sequence. She may also pose the question verbally to the students.

Figure 9A:
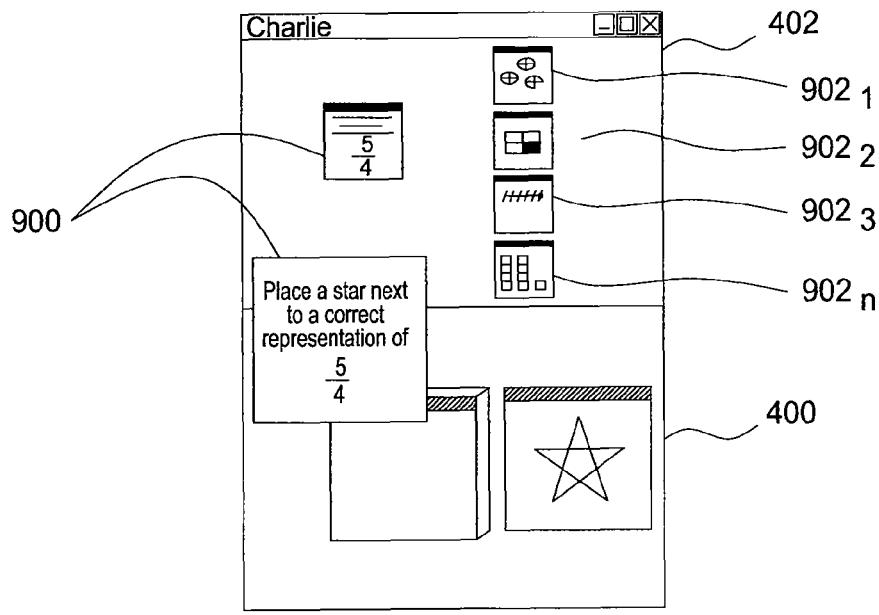
FIG. 9A depicts one embodiment of an eleventh step in the exemplary use of the present invention.
Figure 9B:
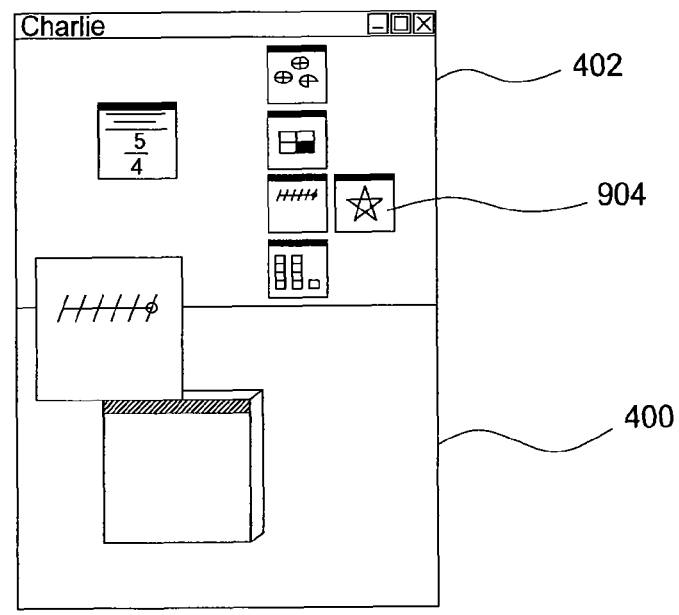
FIG. 9B depicts one embodiment of a twelfth step in the exemplary use of the present invention.

As shown in FIG. 9A, which depicts one embodiment of an eleventh step in the exemplary use of the present invention, Charlie uses the single annotation view overlay to look over the question-posing annotation 900. He also looks over the choices of alternate representation annotations $902_1$-$902_n$ (hereinafter collectively referred to as "alternate representation annotations 902"). Upon deciding again on the number line representation (i.e., alternate representation annotation $902_3$), Charlie draws a star annotation 904 on his self-refreshing annotation pad and drags it to the public panel 402, placing the star annotation 904 next to the number line representation annotation $902_3$, as shown in FIG. 9B, which depicts one embodiment of a twelfth step in the exemplary use of the present invention.

Figure 10:
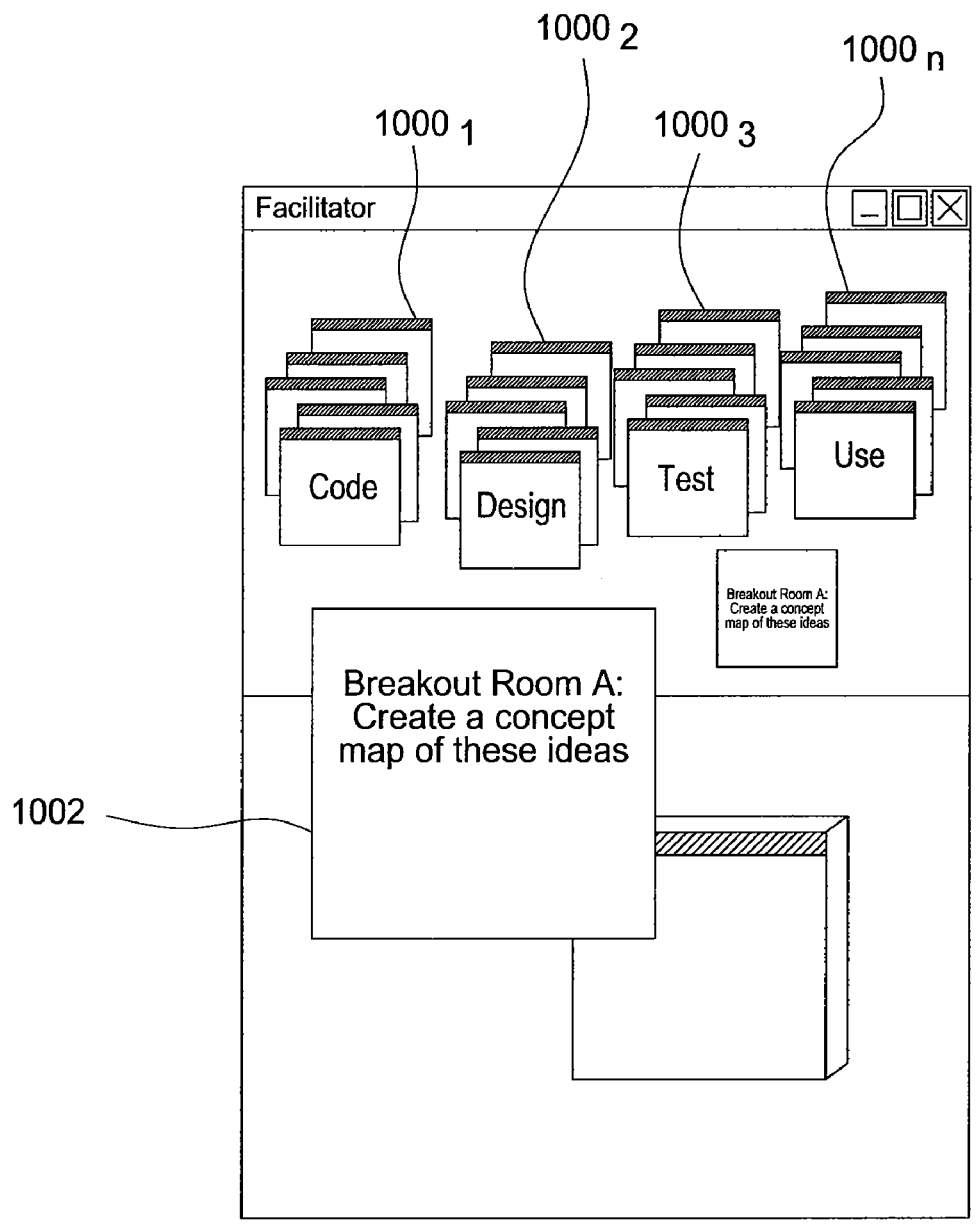
FIG. 10 depicts a second exemplary mode of operation of the current invention.

FIG. 10 depicts a second exemplary mode of operation of the current invention. Specifically, FIG. 10 illustrates the present invention's utility in supporting the formation of discussion groups. In the exemplary scenario illustrated in FIG. 10, twenty participants and a facilitator have been generating and classifying ideas for further discussion. The ideas, captured on annotations, have been organized into a plurality of clusters $1000_1$-$1000_n$ (hereinafter collectively referred to as "clusters 1000"). The facilitator wants to break the large group into several smaller groups to each expand on the ideas generated and to report back to the whole group after the breakout. The facilitator gives a charge to each group by introducing an annotation 1002 into the public space beneath each cluster that includes the group's goal and the breakout room for that group.

Each participant reviews the goals of each group and the associated ideas and selects: (1) a group in which to participate; and (2) an idea to support. In one embodiment, a participant makes these selections by dragging the annotation representing the selected idea to the private panel of his/her user interface (thus "claiming" the selected idea) and then proceeding to the associated breakout room. In the associated breakout room, the participants discuss the associated ideas and work toward the assigned goal, placing the result of the discussion back on the public panel of the user interface next to the footnote designating of the breakout room.

During the breakout session, participants in a given breakout room work collaboratively and exchange annotations by moving some annotations to the public panel and moving other annotations to their private panels. When the participants are ready, they move all of the results back to the public panel and rejoin the whole group discussion.

To leverage the power of the collaborative spatial arrangements of annotations, in some embodiments the invention further involves discretizing the potential arrangements of annotations, especially in the public panel of the user interface, so as to eliminate "accidental" misalignments and consequent need for users to adjust annotations into alignment. In one embodiment, this is achieved by way of applying the well-understood art of "snap to grid", in which, upon release, an annotation's location is rounded to the nearest integer in units of an annotation-sized tiling of the (private or public) panel in which the annotation is placed.

In a further embodiment, each cell of the grid may be provided with its own rules to modulate the arrangements. For example, a column of cells may be assigned a rule dictating that no annotations are allowed on cells, and, hence, annotations dropped on the cells will be moved off to the right or left. This is beneficial, for example, when clean boundaries between regions of the user interface are required for use by different groups. Similarly, a rule may dictate that if there is more than one annotation in a cell, then one of the annotations should be moved to the next cell to the right. Such a rule can be applied to cells in a region of the user interface to enable automatic generation of a histogram out of annotations dropped on the user interface's left edge. Similarly, a rule that restricts access (viewing and manipulating) to annotations to a select set of users can be applied to a region of the user interface to provide a "semi-private" space in which a team may work.

In one embodiment, annotations may be grouped so that the annotations form a visible, hierarchical unit than can be positioned and dragged as a whole. In one embodiment, this is accomplished using a collating user interface element that functions in a manner similar to a paper clip. One embodiment of the collating element has substantially the same structure as an annotation and follows the same rules with key exceptions. When a collating element is moved on top of one or more annotations and is released, the annotations beneath the collating element are aligned to the collating element and to each other, thus becoming a collated group of annotations. The collating element itself then becomes the surrogate drag bar for the collated group as a whole. Similarly, when an annotation is released on top of a collating element or a collated group, it is added to the collated group. One embodiment extends the contention resolution method 300 discussed with reference to FIG. 3 to the collated group by adding a link from the selection token of the collating element to the selection token of each annotation of the collated group. The existence of this link is interpreted as indicating that the annotation is part of the corresponding collated group and should be rendered in alignment with the position of the collating element. According to the contention resolution method 300, an individual annotation can then be selected and moved independently of the collating element, but unless dragged from the public panel to the private panel, or vice versa, when released, the individual annotation will snap back to the location of the collating element.

Some embodiments of the invention include simply, and (re-)movably footnoting annotations with small, pre-determined geometric shapes or markers. In one embodiment, these markers are an annotation analog of "sticky dots", which are useful for group voting and categorization of ideas. Like a collating element, a marker has substantially the same structure as an annotation and follows the same conventions, with key exceptions. In particular, when released on top of an annotation, the marker becomes associated with the annotation in much the way that an annotation becomes associated with a collating element. The marker's rendering position is then defined relative to the position of the annotation, so that when the annotation is moved, the marker moves with the annotation. Like the collating element, the marker's entire visible region serves as a drag bar. Unlike the annotation in a collated group, however, successfully selecting a marker immediately dissociates the marker from the annotation with which the marker is associated (if any), since accidental selection in this case is unlikely and of little consequence.

Some embodiments of the invention include a means to effectively "flip over" any annotation to provide a second, normally hidden, drawing surface permanently associated with the annotation. This mechanism may be employed to footnote, grade, or otherwise refer to the content of the primary drawing surface of an annotation.

Some embodiments of the invention include a background drawing surface positioned behind all of the annotations, which is useful for providing a graphical background (e.g., a Venn diagram) against which annotations can be arranged. Such a background drawing surface may be implemented in the same manner as annotations, with the exceptions that the background drawing surfaces have a larger drawing surface and are normally rendered behind all other annotations. Some embodiments of the invention include the means to load a previously created and stored graphical background image from a local or remote storage location to serve as the background drawing surface. This is especially advantageous situations in which the background drawing surface is intended to be an organizing focus for discussion (e.g., a map, a chart, or a detailed image requiring considerable time to produce and of lasting value beyond the immediate use).

Some embodiments of the invention employ tokens with visual indication to mediate use of shared resources. For example, it is often undesirable to promote concurrent drawing on the background drawing surface of a public panel by multiple users. In this case, a token visually evoking, for example, a drawing marker, can be included the public panel. To write on the background drawing surface, a user selects and drags the marker token to his/her private panel, in accordance with the contention resolution method 300 described previously herein. The user interface recognizes the presence of the marker token in the user's private panel as an indication that the user is permitted to write on the background drawing surface and thus enables the drawing feature. When finished, the user (or the client application) returns the marker token to the public panel from which the marker token came, releasing the background drawing surface for other users to edit.

Some embodiments of the invention include alternate means of configuring the graphical content of annotations. In particular, embodiments of the invention provide the ability to import graphical data in digital form, where the graphical data was created elsewhere (i.e., not in the public or private panel of the user interface). Importing of data advantageously allows a user to use a familiar medium (e.g., pen and paper) to create graphical content to be loaded into an annotation. In certain embodiments, graphical data may be imported from an image capture device, such as a camera, a scanner or the like. For example, a camera contained in a mobile telephone has both image capture and communication capability, such that a photograph (digital image) may be captured on the mobile telephone and automatically imported from the mobile telephone as a new annotation on a user's private panel. Other contemplated embodiments include use of a digital pen (e.g., as described in U.S. Pat. No. 6,985,643, issued to Fahraeus et al.), wherein an image rendered using the digital pen may be uploaded and automatically posted on a user's private panel.

Some embodiments of the invention include a means for determining and displaying to a user properties and statistics relating to the current configuration and activity history of one or more (public and/or private) panels. For example, the number of annotations in a selected region of the panel, the number of markers or other attachments to an annotation, a graph of the number of changes to a public panel over time, and other similar statistical and configuration properties may be conveyed using this mechanism. Such properties may be displayed for all users (e.g., total number of annotations posted by all users), or by a subset of all users, such as an individual or a collaborative team (e.g., total number of markers posted by team B). This information may be especially useful in educational situations where monitoring the level of involvement or degree of convergence in thinking are important feedback data for the teacher or other leader.

Some embodiments of the current invention include a means for allowing a user to temporarily draw attention to an annotation or other element of a public panel. One such means is provided by a selectable property on the annotation or other item that, when selected, indicates to all users that this annotation should be rendered in a distinctive way until such time as that property is de-selected. Such distinctive renderings of an annotation are contemplated to include pulsing or flashing of all or part of the annotation, varying the text or the background of the annotation (e.g., by using colored, bold, or other font variations), and the like. Some embodiments may include just one, or more than one, available means for drawing attention to an annotation or other item in the public panel (e.g., just flashing, or flashing and bold and red/blue/green colors).

Some embodiments of the invention include a means for a user to create a self-refreshing annotation pad from one or more annotations, wherein the sequence of annotations that may be pulled from the pad replicates the sequence of annotations either indefinitely, or up to a fixed number of annotations. This has special utility when a teacher wishes to distribute variants of materials substantially evenly among a plurality of students (e.g., four different versions of an addition problem). The teacher may create the variants of the materials and convert the collection of variants into a self-refreshing annotation pad. All students may then be asked to take a problem from the annotation pad, thereby allowing the variants to be distributed substantially evenly among the students.

Some embodiments of the invention include a means for transferring the contents of one or more selected panels, in structured form, to and from an external storage medium. In one embodiment, the structure is extensible markup language (XML), and the medium is computer memory or disk storage.

Figure 11:
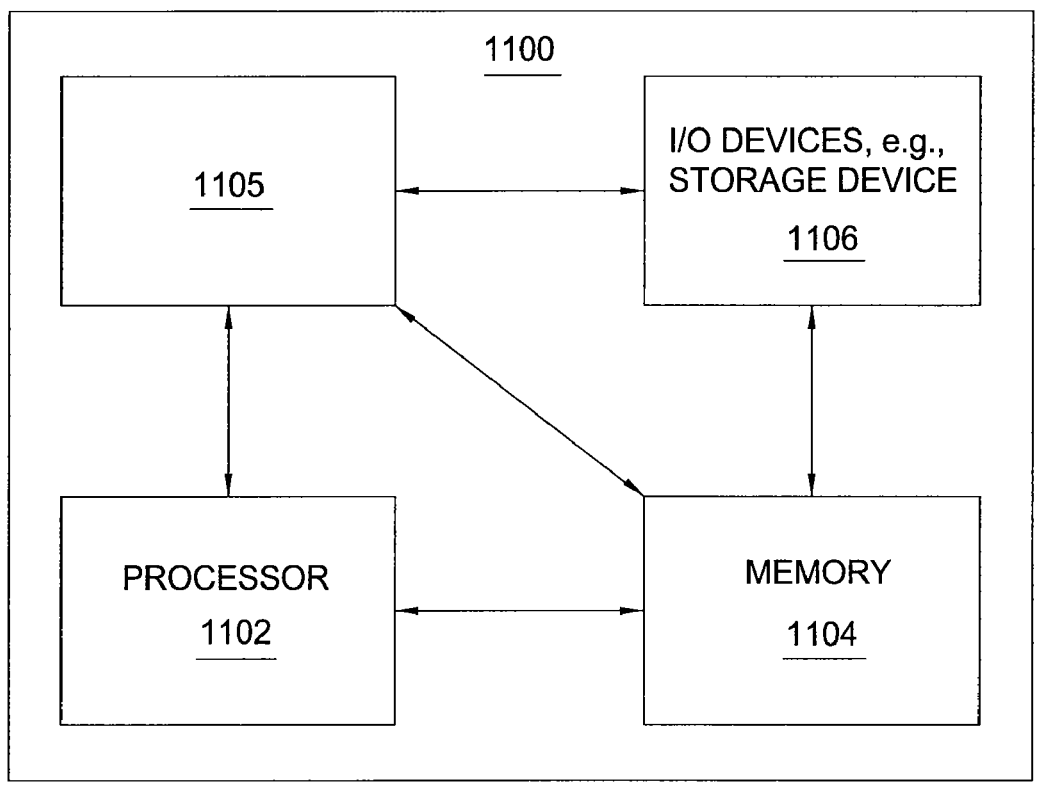
FIG. 11 is a high-level block diagram of the inventive collaborative user interface that is implemented using a general purpose computing device.

FIG. 11 is a high-level block diagram of the inventive collaborative user interface that is implemented using a general purpose computing device 1100. In one embodiment, a general purpose computing device 1100 comprises a processor 1102, a memory 1104, a user interface module 1105 and various input/output (I/O) devices 1106 such as a display, a keyboard, a mouse, a stylus, a wireless network access card, and the like. In one embodiment, at least one I/O device is a storage device (e.g., a disk drive, an optical disk drive, a floppy disk drive). It should be understood that the user interface module 1105 can be implemented as a physical device or subsystem that is coupled to a processor through a communication channel.

Alternatively, the user interface module 1105 can be represented by one or more software applications (or even a combination of software and hardware, e.g., using Application Specific Integrated Circuits (ASIC)), where the software is loaded from a storage medium (e.g., I/O devices 1106) and operated by the processor 1102 in the memory 1104 of the general purpose computing device 1100. Thus, in one embodiment, the user interface module 1105 for facilitating computer-supported collaborative work as described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Thus, the present invention represents a significant advancement in the field of computer-supported collaborative work environments. Embodiments of the present invention use a graphical user interface that enables collaborative work environments when implemented on each of a plurality of networked computing devices. Further embodiments of the present invention facilitate organized collaboration by automatically resolving situations in which two or more collaborators simultaneously contend for the same shared resource.

Although various embodiments which incorporate the teachings of the present invention have been shown and described in detail herein, those skilled in the art can readily devise many other varied embodiments that still incorporate these teachings.

What is claimed is:

1. A computer readable medium containing an executable program for facilitating a collaborative task undertaken by a plurality of users, each of the users using a networked computing device that displays a user interface, the user interface including a public panel representing a shared workspace viewable by all of the plurality of users and a separate private panel representing a personal workspace viewable only by a user with whom the personal workspace is associated, wherein the public panel and the private panel are displayed simultaneously, where the program performs steps of:

receiving, by a server, a first request from one of the users to move a component from the shared workspace to the personal workspace associated with the one of the users, the component representing an individual contribution to the collaborative task, the component further displaying content of the individual contribution for viewing by the plurality of users;

transferring the component from the shared workspace to the personal workspace associated with the one of the users, wherein the first request is received in the form of a command that executes as a transaction, such that both a removal of the component from the shared workspace and a placement of the component in the personal workspace of the transferring succeed or fail together;

rendering the component unavailable for use by a remainder of the plurality of users, wherein the component is visible to the remainder of the plurality of users while unavailable, and wherein a visual appearance of the public panel is identical to all of the users when the component is rendered unavailable, and wherein said rendering is triggered by receiving the first request in the form of a graphical gesture in the user interface; and cancelling one or more other requests by the one of the users in response to the first request.

2. The computer readable medium of claim 1, further comprising:

fulfilling the first request;

receiving, by the server, a second request from one of the remainder of the plurality of users to perform an action on the component; and rejecting the second request.

3. The computer readable medium of claim 1, further comprising:

making the component unavailable for use by the remainder of the plurality of users in response to a termination of the graphical gesture and to a success or failure of a transaction resulting from said rendering.

4. The computer readable medium of claim 1, further comprising:

receiving, by the server, a second request from the one of the users to move the component from the personal workspace back to the shared workspace; and rendering the component available for use by the remainder of the plurality of users.

5. The computer readable medium of claim 4, wherein the second request writes a token associated with the component back to the server.

6. The computer readable medium of claim 1, further comprising:

updating, by the server, a representation of the shared workspace in the public panel, wherein the updating indicates a current status of each component in the shared workspace, the current status indicating whether an associated component is currently available or unavailable for use.

7. The computer readable medium of claim 6, wherein the updating is performed in response to a user-initiated update request.

8. The computer readable medium of claim 6, wherein the updating is performed in accordance with an update schedule.

9. The computer readable medium of claim 6, wherein the updating is performed in response to a predefined action.

10. The computer readable medium of claim 1, wherein the component comprises at least one of: a graphic or text.

11. A method for facilitating a collaborative task undertaken by a plurality of users, each of the plurality of users using a networked computing device that displays a user interface, each computing device's user interface presenting a plurality of panels, each panel enabling a user to read contents and modify attributes of a plurality of contributions, said plurality of contributions stored in a workspace associated with the panel, the method comprising:

receiving, by a server, a first request from one of the users to move a first contribution from a public panel, said public panel enabling the plurality of users to read and modify a first set contributions in an associated workspace for the public panel, to a separate personal panel, said personal panel enabling one user only to read and modify a second set of contributions stored in an associated workspace for the personal panel, wherein the public panel and the personal panel are displayed simultaneously by the user interface;

removing the first contribution from the public panel;

storing the first contribution in the personal panel, wherein a transaction mechanism on the server guarantees that the removing and the storing either succeed or fail as a single unit;

indicating to one or more users who subsequently request the first contribution that the first contribution is not available to be read or modified, wherein the component is visible to the remainder of the plurality of users while unavailable, wherein a visual appearance of the public panel is identical to all of the users when the component is unavailable, wherein said rendering is triggered by receiving the first request in the form of a graphical gesture in the user interface; and cancelling one or more other requests by the one of the users in response to the first request.

12. The method of claim 11, wherein a modification of the first contribution comprises at least one of: moving a position of the first contribution, annotating the first contribution, or indicating a relationship between the first contribution and a second contribution.

13. A method for facilitating a collaborative task undertaken by a plurality of users, each of the users using a networked computing device that displays a user interface, the user interface including a public panel representing a shared workspace viewable by all of the plurality of users and a separate private panel representing a personal workspace viewable only by a user with whom the personal workspace is associated, wherein the public panel and the private panel are displayed simultaneously, the method comprising:

receiving, by a server, a first request from one of the users to move a component from the shared workspace to the personal workspace associated with the one of the users, the component representing an individual contribution to the collaborative task, the component further displaying content of the individual contribution for viewing by the plurality of users;

transferring the component from the shared workspace to the personal workspace associated with the one of the users, wherein the first request is received in the form of a command that executes as a transaction, such that both a removal of the component from the shared workspace and a placement of the component in the personal workspace of the transferring succeed or fail together;

rendering the component unavailable for use by a remainder of the plurality of users, wherein the component is visible to the remainder of the plurality of users while unavailable, wherein a visual appearance of the public panel is identical to all of the users when the component is rendered unavailable, and wherein said rendering is triggered by receiving the first request in the form of a graphical gesture in the user interface; and cancelling one or more other requests by the one of the users in response to the first request.

14. The method of claim 13, further comprising:

fulfilling the first request;

receiving, by the server, a second request from one of the remainder of the plurality of users to perform an action on the component; and rejecting the second request.

15. The method of claim 13, further comprising:

making the component unavailable for use by the remainder of the plurality of users in response to a termination of the graphical gesture and to a success or failure of a transaction resulting from said rendering.

16. The method of claim 13, further comprising:

receiving, by the server, a second request from the one of the users to move the component from the personal workspace back to the shared workspace; and rendering the component available for use by the remainder of the plurality of users.

17. The method of claim 16, wherein the second request writes a token associated with the component back to the server.

18. The method of claim 13, further comprising:

updating, by the server, a representation of the shared workspace in the public panel, wherein the updating indicates a current status of each component in the shared workspace, the current status indicating whether an associated component is currently available or unavailable for use.

19. The method of claim 18, wherein the updating is performed in response to a user-initiated update request.

20. The method of claim 18, wherein the updating is performed in accordance with an update schedule.

21. The method of claim 18, wherein the updating is performed in response to a predefined action.

22. The method of claim 18, wherein the component comprises at least one of: a graphic or text.

* * * * *